Aug. 25, 1959 L. L. HUELSDONK 2,901,134
MUCKER SKIP
Filed June 25, 1957 10 Sheets-Sheet 3
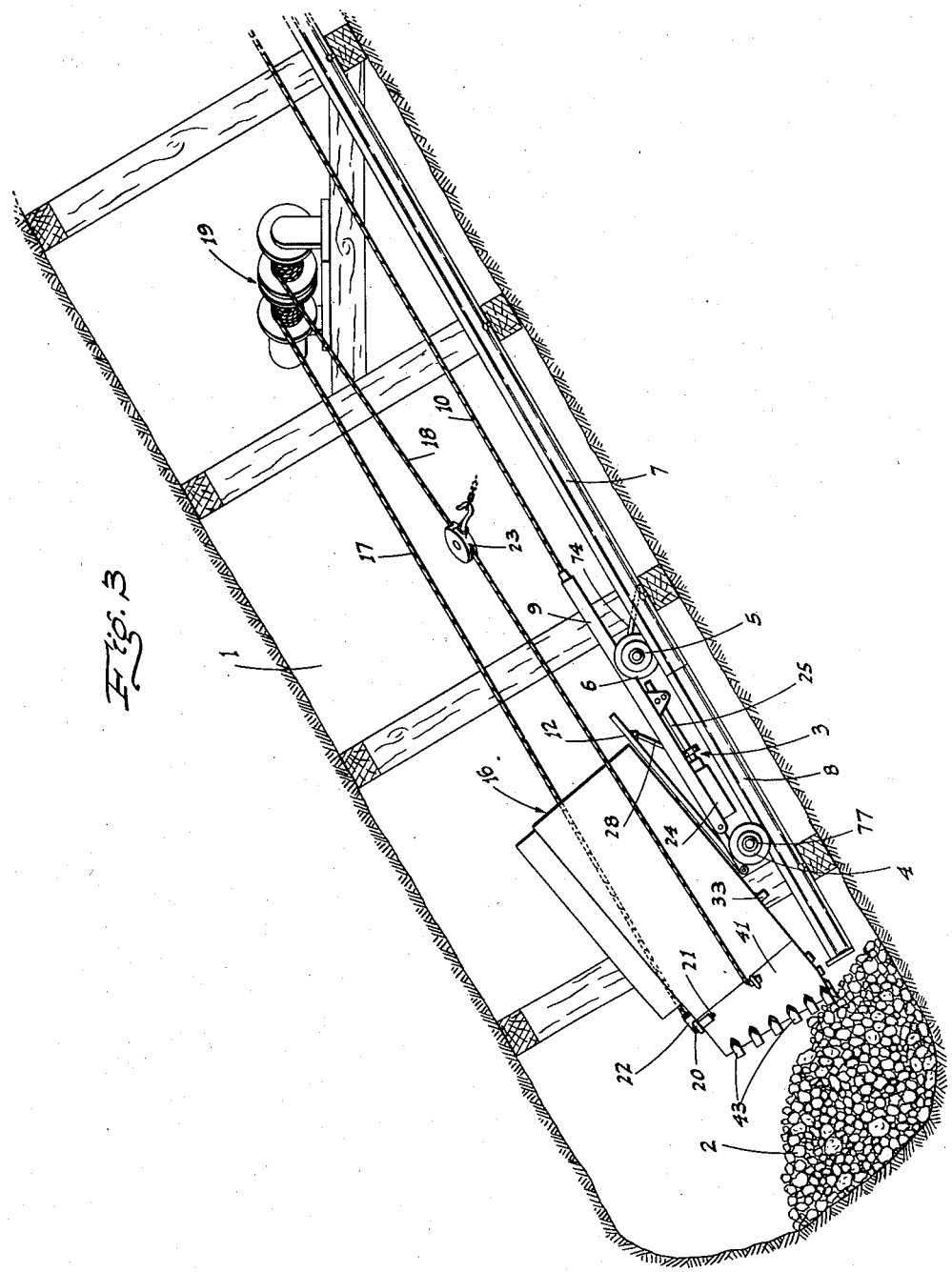
INVENTOR.
Lewis L. Huelsdonk
BY Webster & Webster
ATTYS.

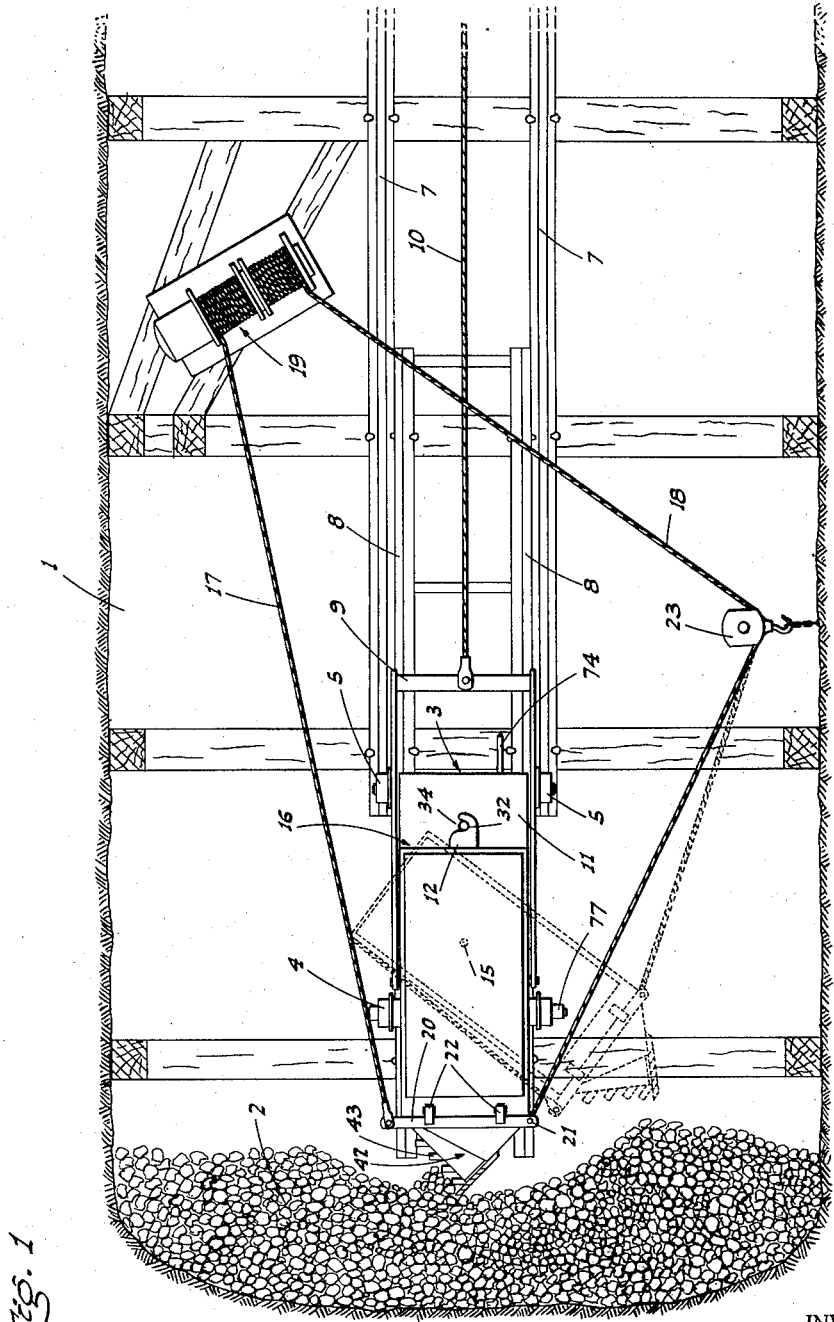

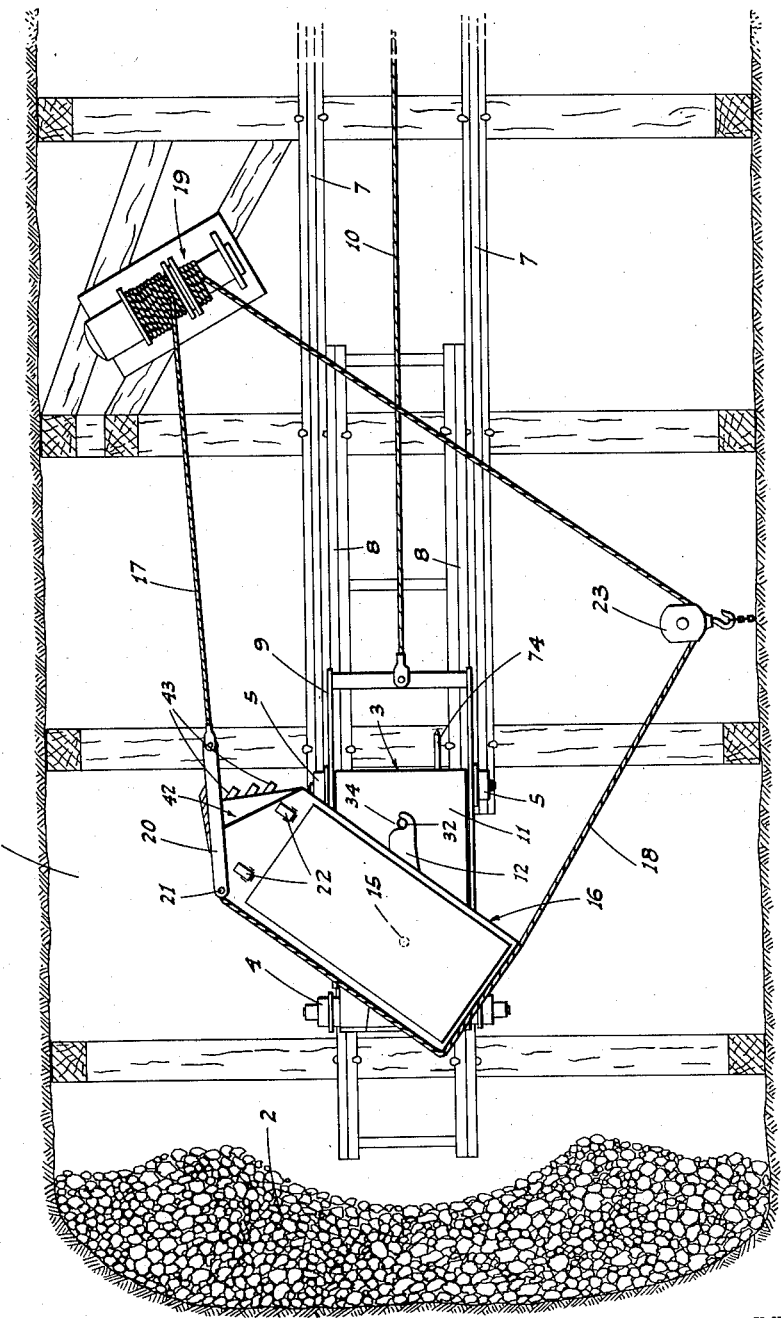

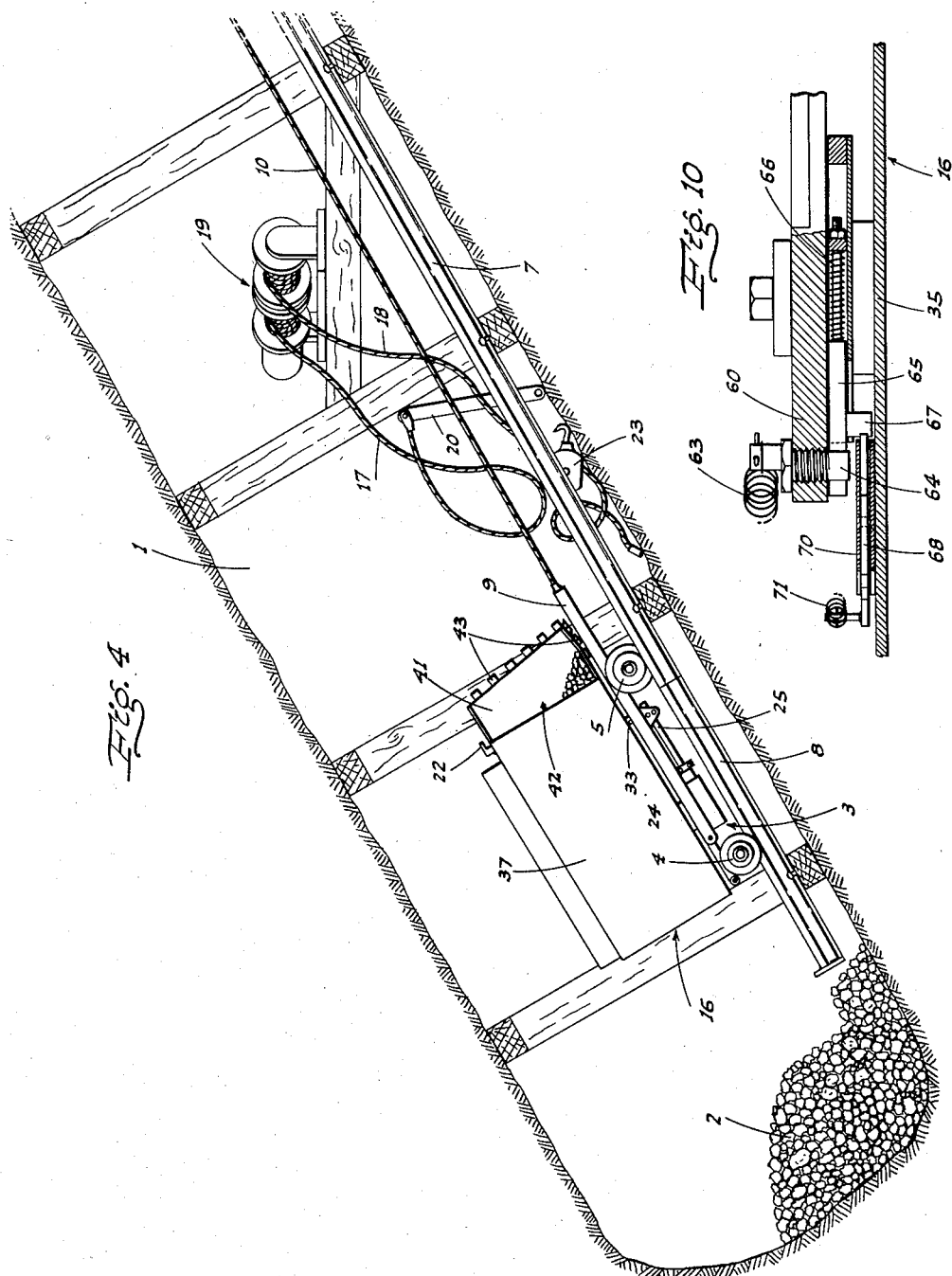

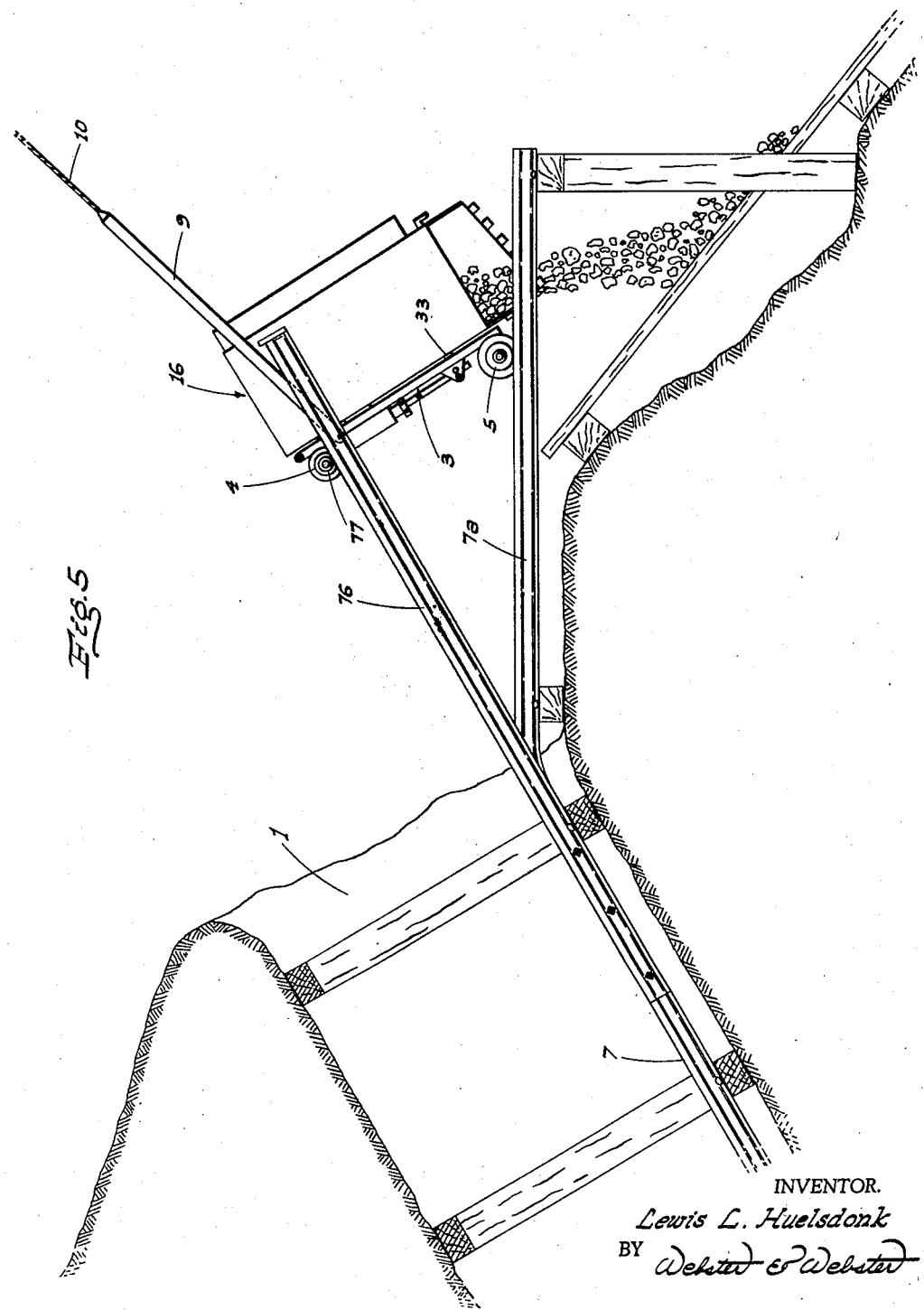

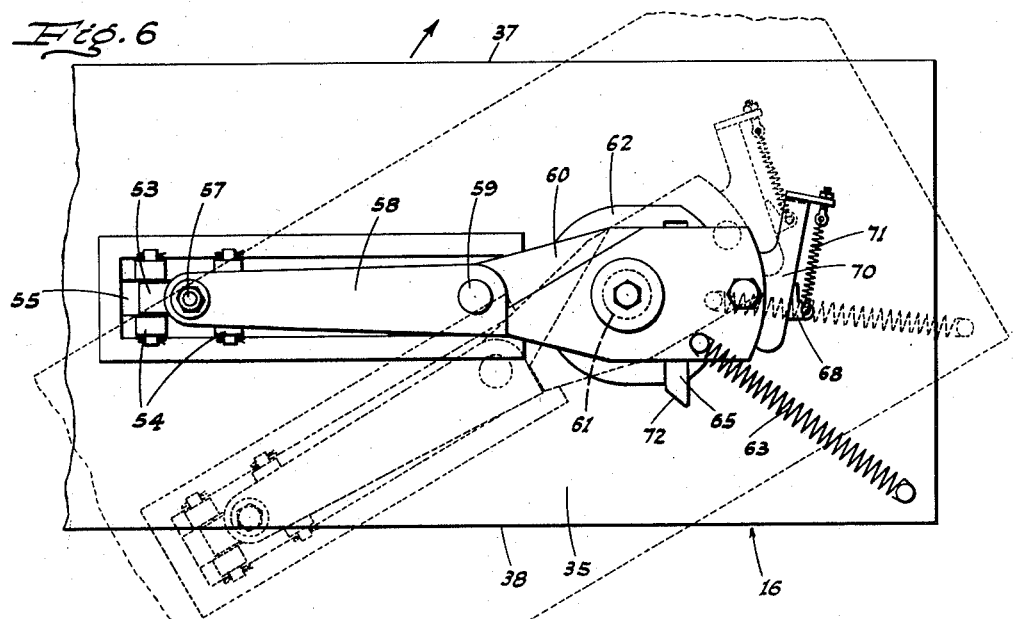
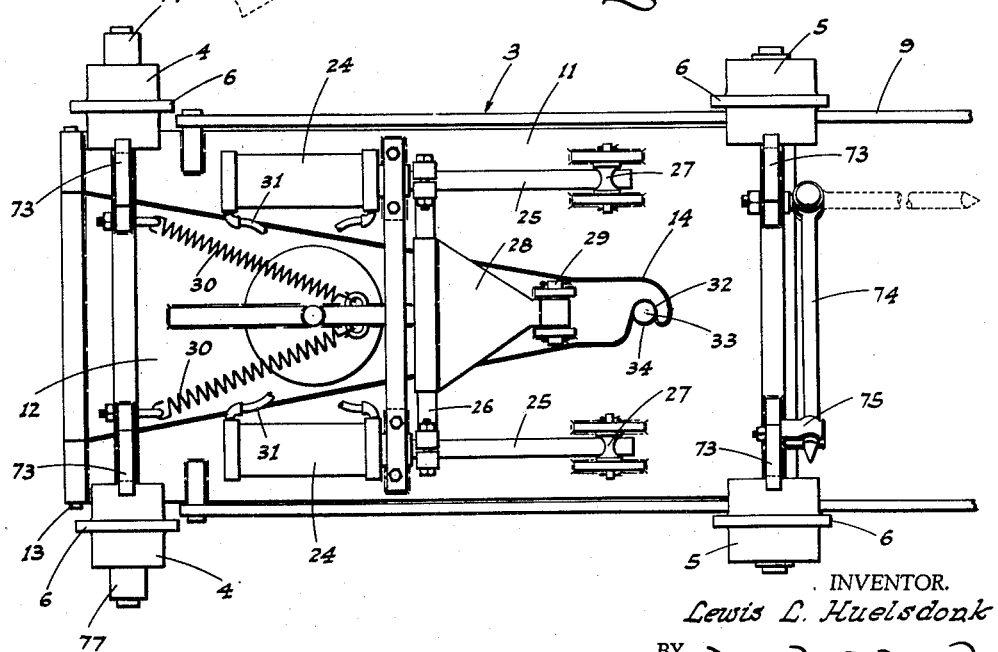

INVENTOR.
Lewis L. Huelsdonk
BY Webster & Webster
ATTYS.

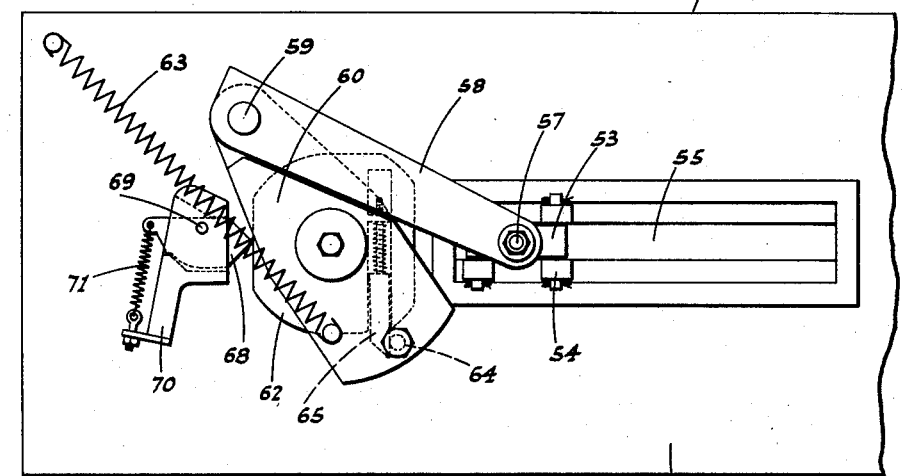
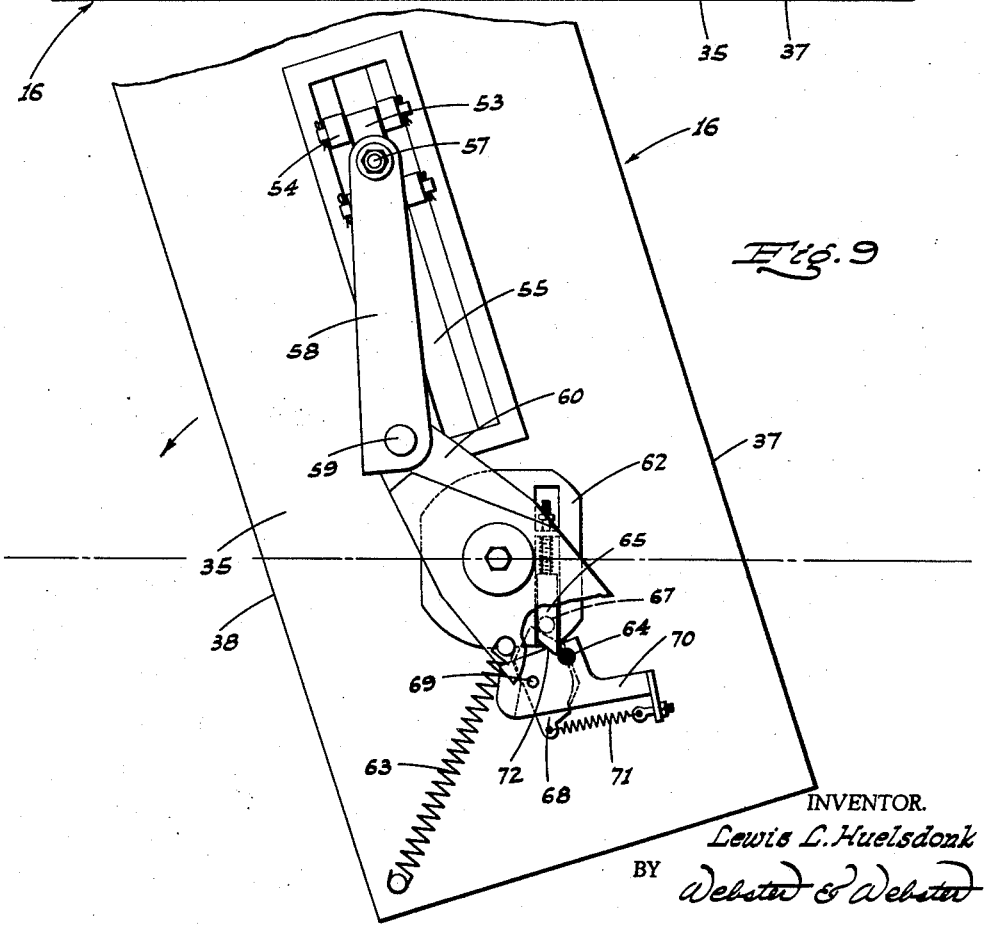

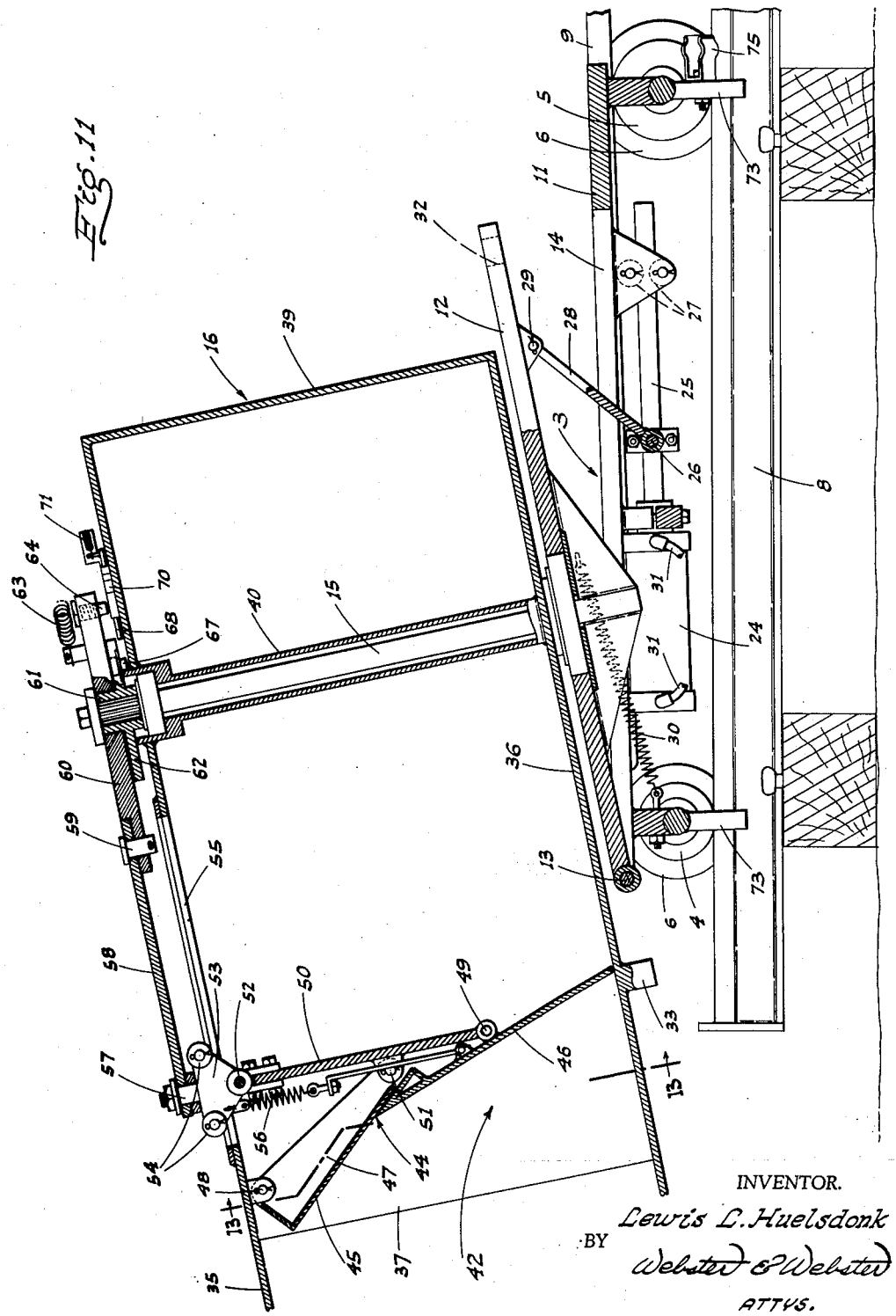

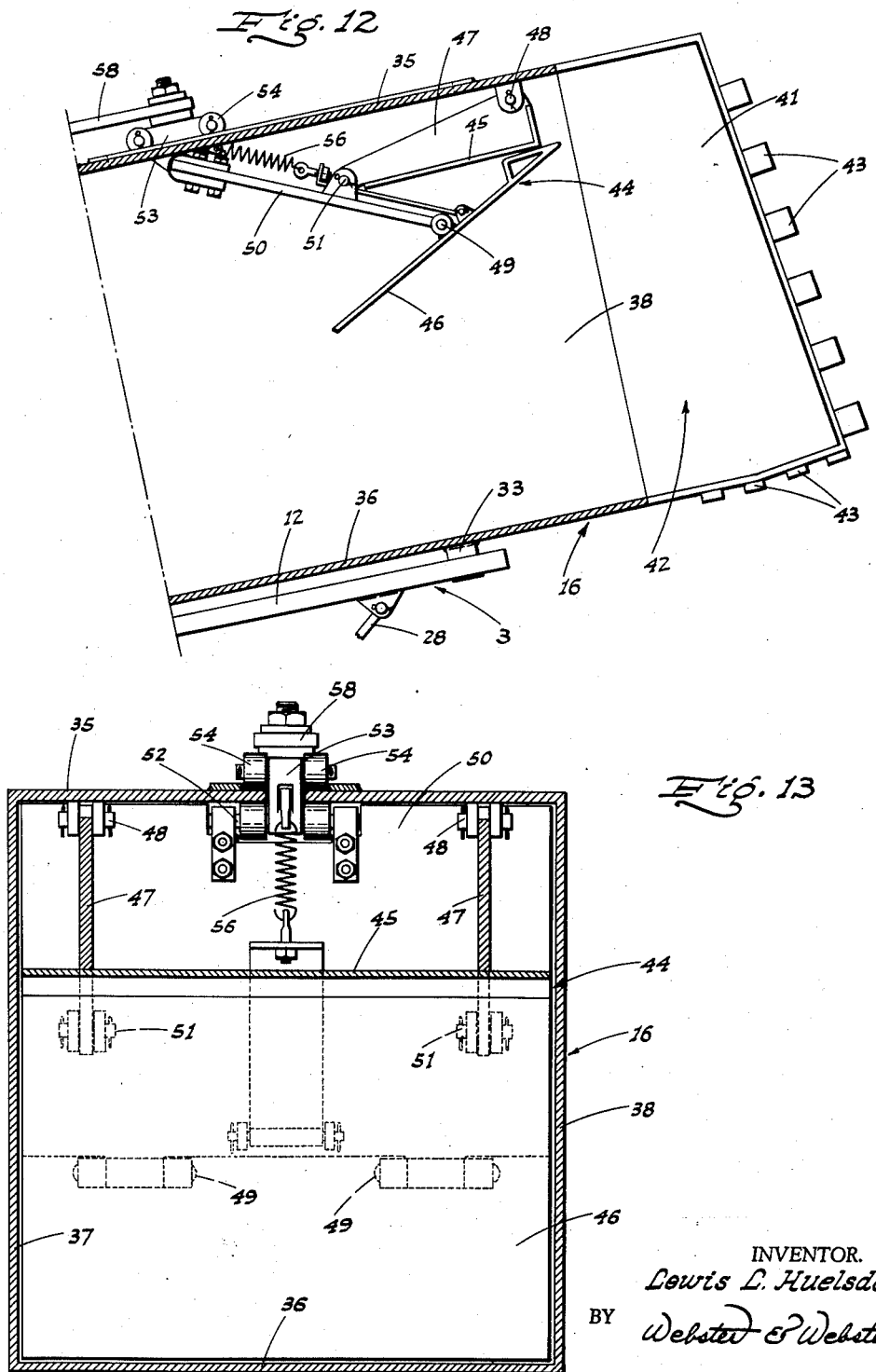

United States Patent Office 2,901,134
Patented Aug. 25, 1959

2,901,134

MUCKER SKIP

Lewis L. Huelsdonk, Downieville, Calif.

Application June 25, 1957, Serial No. 667,801

13 Claims. (Cl. 214—103)

This invention relates to mining shaft-digging equipment for inclined shafts; the major object being to provide a muck-loading skip which includes a bucket which can be manipulated from a relatively remote point, and by means of which muck in the shaft at the head end thereof can be readily loaded into the skip bucket without the presence of an operator at the skip itself.

Another object of the invention is to so construct the skip that the angle of the bucket—in a plane lengthwise of the shaft, and which controls the area of digging in a relatively vertical plane—may be altered at will be the operator stationed at a remote point in the shaft.

A further object of the invention is to provide the bucket with a digging scoop and with an automatically functioning gate structure back of the scoop arranged—upon suitable operative manipulation of the bucket—to open to admit a scoop-full into the bucket, and to close when another scoop load is being dug or picked up. This insures that the muck already delivered to the bucket will not slide out therefrom, as would otherwise be the case when the shaft and the skip are on an incline, as is usually the case.

An additional object of the invention is to arrange the bucket in connection with its wheel-mounted skip base, and the latter with a supporting rail arrangement, so that the bucket will autom'tically swing to a dumping position when the skip is pulled out of the shaft.

It is also an object of the invention to provide a practical, reliable, and durable mucker skip, and one which will be exceedingly effective for the purpose for which it is designed.

These objects are accomplished by means of such structure and relative arrangement of parts as will fully appear by a perusal of the following specification and claims.

In the drawings:

Fig. 1 is a somewhat diagrammatic plan view showing the skip advanced to the head of the shaft and with the scoop thereof loading from the muck in the shaft.

Fig. 2 is a similar view, showing the position of the skip bucket after a scoop full has been dug.

Fig. 3 is a longitudinal and somewhat diagrammatic view showing the skip in the position of Fig. 1.

Fig. 4 is a similar view showing the skip as being pulled out from the shaft and with the bucket-swinging cables disconnected.

Fig. 5 is a similar view showing the skip as in dumping position.

Fig. 6 is a fragmentary enlarged top plan view of the skip bucket showing the gate actuating mechanism thereon; the gate being closed in this position of said mechanism.

Fig. 8 is a similar view showing the position of the gate actuating mechanism when the gate is fully open.

Fig. 9 is a similar view, showing the gate actuating mechanism as being tripped to cause the gate to close.

Fig. 10 is a fragmentary enlarged section on line 10—10 of Fig. 7.

Fig. 11 is a longitudinal section of the skip, showing the bucket tilted relative to the skip carriage.

Fig. 12 is a fragmentary somewhat enlarged longitudinal section of the bucket looking at the side thereof opposite to that shown in Fig. 11, and with said bucket rotated 180 degrees from the showing of Fig. 11.

Fig. 13 is a cross section substantially on line 13—13 of Fig. 11.

Fig. 15 is a bottom plan view of the skip carriage, showing the bucket mounting platform as seated in the deck of the carriage and with the bucket mounted pin as locked against movement relative to the deck.

Figure 7:
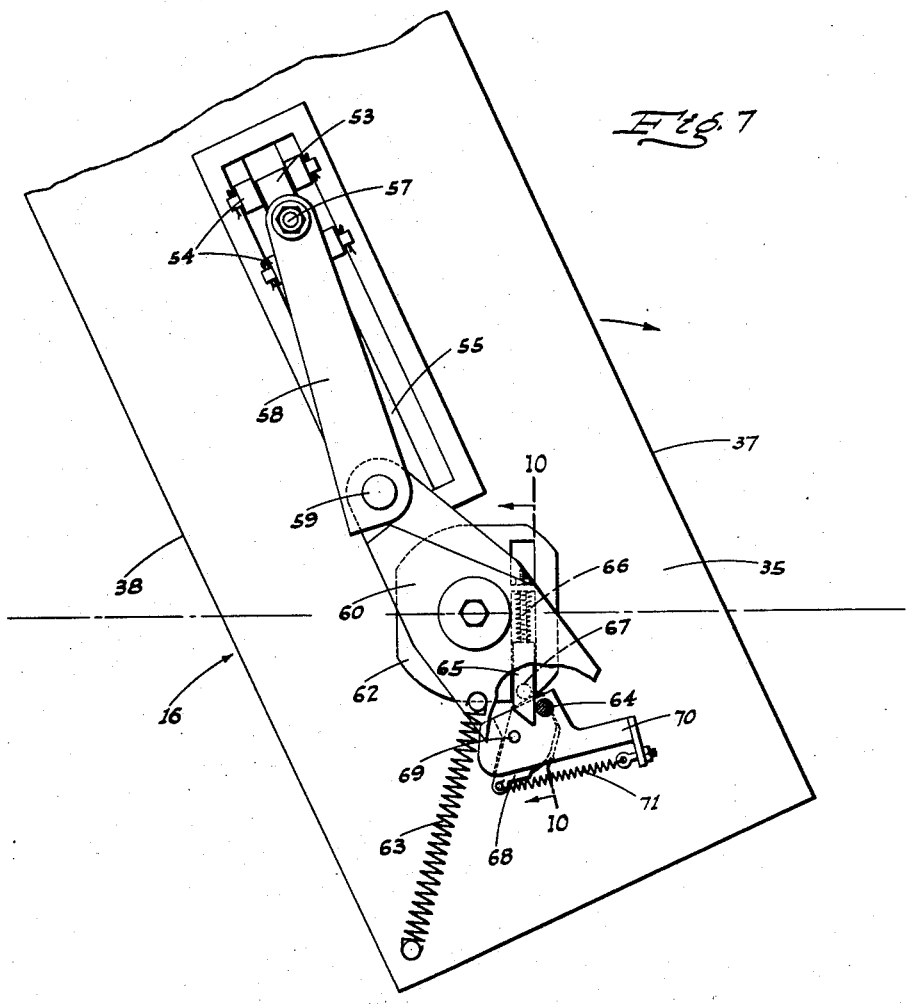
Fig. 7 is a similar view showing the position of the gate actuating mechanism as the gate starts to open.

Referring now more particularly to the drawings, and to the characters of reference marked thereon, the numeral 1 denotes an inclined shaft in which the improved mucker skip is employed to remove the muck 2 in the head end of the shaft. The skip itself comprises a carriage, indicated generally at 3, and which is mounted on longitudinally spaced pairs of wheels 4 and 5. These wheels have extra wide treads divided by a rail engaging flange 6. The wheels are thus adapted, outside the flange, to engage main rails 7 mounted on the floor of the shaft and parallel thereto, and also inwardly of the flange to engage an extension and forwardly shiftable rail unit 8 of a somewhat smaller gauge than that of rails 7. A bail 9 straddles—and is secured to—the carriage 3 adjacent but back of wheels 4 and is connected to a main hoist cable 10.

The carriage includes a top deck 11 and a platform 12 transversely pivoted at its forward end on the forward end of the carriage, as at 13, and arranged to be countersunk into a matching opening 14 in the deck for the purpose which will be seen later.

The platform 12 serves as the support for an upstanding spindle 15 on which the skip bucket, indicated generally at 16, is turnably mounted at a point nearer its normally rear end than its front end, as shown in Fig. 11.

Swinging of the bucket about the spindle 15 is controlled by means of laterally projecting cables 17 and 18 extending to the skip from a double-drum reversible winch 19 mounted in shaft 1 some distance back from the head of the shaft and laterally offset from the rails 7, as shown in Fig. 1.

Cable 17, which is the digging line, extends to connection with one end of a cross bar or digging bail 20; said end being at one side of the bucket. The bail 20 extends across the front end of the bucket at the top thereof and the other end of the bail 20 is detachably connected to the bucket on the other side thereof by a removable upstanding pivot pin 21. Intermediate its ends the bail is initially engaged under lugs 22 secured on the bucket and which prevent the bail 20 from swinging back over the bucket with a pull on the cable.

The pull-back cable 18 extends from the corresponding winch drum to a detachable connection with the other side of the bucket at the forward end thereof; said cable intermediate its ends passing about a direction-changing pulley 23 secured in connection with the side wall of the shaft on the same side thereof as said other side of the bucket, so that the cable approaches the bucket at an acute angle thereto when said bucket is disposed in longitudinal alinement with the shaft and rails, as shown in Fig. 1.

By means of this arrangement, and by pulling on cable 17 while slacking off on the other cable 18, the bucket may be swung on the skip carriage 3 from the dotted-line position of Fig. 1 to and beyond the full-line position shown in Fig. 2 so as to dispose the bucket in longitudinal alinement with the carriage 3, but reversed from the position of Fig. 1.

With this movement of the bucket, the bail 20 moves from under the lugs 22 and swings about pin 21 as an axis and pulling point, while cable 18 wraps partially about the bucket, as shown in Fig. 2. This enables a pull on cable 18 to swing the bucket to its original position from a reversed position at the option of the winch operator.

The bucket-supporting platform 12 is swung up or down relative to the carriage deck 11, about pivot 13 as an axis, so as to dispose the bucket at different vertical angles to the muck 2, by the following means:

Secured on the under side of the deck 11 on opposite side of opening 14 are longitudinally extending air cylinders 24 to the piston rods 25 of which a cross bar 26 is connected (see Fig. 15). Each rod is engaged, beyond the stroke zone of the cross bar, by guide rollers 27 mounted on the deck in position to relieve the rod of bending strains.

A swing arm 28 is turnably mounted on the cross bar 26 and extends at an upward angle through opening 14 to a pivotal connection 29 with the under side of the platform 12. Tension springs 30 connected between the skip carriage 3 and the platform 12 tend to lower the same. The air hoses 31 to the cylinders extend along the shaft 1 to a source of pressure outside the shaft, and are disconnected from the cylinders when the skip is being pulled out of—or lowered into—the shaft. It may here be noted that the operation of the air cylinders 24 is controlled by the operator of the winch 19, by means of a conventional three-way valve (not shown) suitably connected to the hoses 31 and to the main supply hose.

The platform 12 is formed at its rear or free end with a hook-like opening 32 which faces laterally in the direction toward which the bucket swings when being pulled to a reversed position by the cable 17.

A stub pin or lug 33 is secured on—and depends from—the bucket in position relative to the mounting spindle 15 of the bucket so as to enter opening 32 when the bucket is fully reversed on the carriage. The pin will of course only enter the opening when the platform is raised from the deck 11; the platform-receiving opening 14 therein being formed so as to cooperate with the platform opening 32 in providing a pin surrounding wall, as shown at 34 in Fig. 15. The pin 33, when the platform is lowered into the deck, is locked against movement and the bucket cannot then move relative to the carriage.

The bucket 16 is of rectangular form in cross section, being open at its normally forward end and closed at the other end, and comprises a top plate 35, a bottom plate 36, side walls 37 and 38, and a back end plate 39. The spindle 15 projects through the top and bottom plates and within the bucket is enclosed in a sleeve 40.

A laterally extending, forwardly angled digging lip 41 projects from the forward end of side wall 38 in the direction toward which the front end of the bucket is swung when being moved to a reverse position. The top and bottom plates 35 and 36 are extended to engage the corresponding edges of the lip 41 so as to form a scoop 42 therewith. The outer vertical edge of the lip 41 and the forward diagonal edge of the lower plate 36 are fitted with digging teeth 43.

Mounted in the bucket a short distance back from the lip 41, and defining the back or bottom of the scoop, is a transverse gate unit, indicated generally at 44. This unit comprises an upper lift gate member 45 and a lower flap gate 46 which overlaps member 45 at its lower end and in front of the same, as shown in Fig. 11. The member 45 is formed with rearwardly projecting upstanding ribs 47 which, at their upper end, are pivoted to the under side of the top plate 35, as shown at 48. The flap gate 46 is pivoted—intermediate its ends, as at 49— to the lower edge of a normally upstanding plate 50 which, intermediate its ends and on its forward side, is pivoted, as at 51, to the ribs 47 at their lower end. At its upper end, plate 50 is pivoted, as at 52, on a trolley slide 53; the rollers 54 of which ride lengthwise of the bucket on the top plate 35 to the sides of a longitudinal slot 55 in said plate, and through which slot the trolley projects for connection to plate 50.

A tension spring unit 56 extends between—and connects to—the trolley slide 53 and the gate 46 in front of pivot 49, so as to yieldably hold said gate against the upper gate member 45. The gate members normally have a forward and upward slope and the lower edge of the gate 46 engages the bottom plate 36, so that back pressure of a load in the bucket cannot swing the gate open.

With the above described arrangement, it will be seen that if the trolley slide is pulled back along the bucket from the position it occupies when the gate unit 44 is closed, the gate will be raised to a folded position of the parts, as shown in Fig. 12. Such opening is automatically effected, as the bucket is swung from the digging position of Fig. 1 to the reversed position of Fig. 4, by the following means, as shown particularly in Figs. 6–9, and 11.

Turnable on a pin 57 rigid with and upstanding from the slide 53 is an arm 58, which extends directly rearwardly toward the spindle 15 when the gate is closed, as shown in Fig. 6. The rear end of the arm is pivoted, as at 59, to the forward end of another but shorter arm 60. This arm is turnable on the hub 61 of a disc 62 which is splined, for circumferential adjustment, on the upper end of the stationary spindle 15. Pin 57, spindle 15, and pivot 59 are in alinement when the gate is closed.

A tension spring 63 connected to the arm 60 and the top plate of the bucket resists rotation of said arm so as to break the straight alinement of the arms in a gate opening direction. Such direction is that which causes a jackknifing of the arms 58 and 60 toward the side 38 of the bucket, which is the trailing side thereof when the bucket is being swung on the carriage from a digging position to a reversed position thereon.

A stop pin 64 depends from the arm 60 adjacent the forward end thereof and clear of disc 62 in position to engage a stop bar 65 slidably mounted in disc 62 and projecting from one side thereof in the direction of the side 38 of the bucket. The stop bar 65 is yieldably advanced by a spring 66 (see Fig. 10). The pin 64 is positioned some distance from the stop bar 65 when the arms 58 and 60 are alined, as indicated in Fig. 6, and engages said bar only after the bucket has swung some distance from its digging position toward its reversed position, as shown in Fig. 7.

The extent of swinging movement of the bucket required before the stop pin 64 engages the stop bar may be altered by adjusting the setting of the bar-mounting disc 62 on the stationary spindle 15.

Since the bar 65 is immovable—in a rotary direction— relative to the bucket, further rotation or swinging of the bucket toward a reversed position causes the arm 60 to be then held in a stationary position. This results in the arm 58, and the trolley slide 53 attached thereto, being pulled back along the bucket to the final position of Fig. 8, and in which position the bucket is fully reversed to the position of Fig. 4, and the gate is fully opened, as shown in Fig. 12.

The gate will then remain open until the bucket is swung toward its digging position to a point where the stop bar 65 is released from its restraining action against pin 64. This allows the tension spring 63, acting on the arms 58 and 60, to snap the gate closed while the loaded muck is in an inert position. The stop bar 65 is thus automatically released by the following means:

A release pin 67 (see Fig. 10) depends from the bar 65 intermediate its ends into the path of a trip arm 68 pivoted, as at 69, in a retainer 70 secured on the top plate 35 of the bucket 16; the trip arm and its retainer being parallel to said top plate and being below and clear of the pin 64, as shown in Fig. 10.

The trip arm 68 is mounted on the bucket back of the disc, and is formed on its forward end and engaged by the retainer in such a manner that while the pivoted arm may freely pivot and move past the release pin 67 without imparting any movement thereto upon swinging movement of the bucket away from a digging position, said trip arm is held rigid as it moves past the release pin 67 upon swinging movement of the bucket in the opposite direction. A spring 71 connects between the trip arm and retainer, and yieldably retains said arm in said rigid position. As a result of this arrangement, the trip arm 68—when in its held or rigid position—moves the stop bar 65 back and clear of pin 64 as the bucket is swung toward a digging position, as indicated in Fig. 9. The arm 60 to which the stop pin 64 is attached being freed of rotative restraint, the spring 63 then acts to swing the arm 60 to a gate closing position.

The trip arm 68 may be set on the bucket so that its stop bar retracting action, and the resultant door closing, will take place sooner than would otherwise be the case, and preferably when the bucket is about in a transverse position in the shaft 1. The pin 64, after having cleared and passed by the stop bar, can then retract and move past the same in the opposite direction as the bucket reassumes a digging position, due to the sloping side edge 72 of the stop bar 65, as shown.

In operation, to remove a load of muck from the bottom of the shaft 1, the skip is lowered to the digging position, after the digging and pull-back lines 17 and 18 have been connected to the bucket, by paying out the main hoist cable 10. When the digging edge of the bucket contacts the muck, the hoist cable is slackened, and the entire weight of the skip is then taken by the lines 17 and 18.

Figure 14:
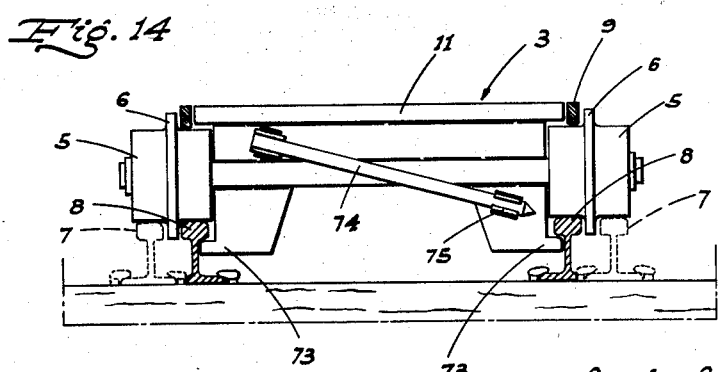
Fig. 14 is a rear end view of the skip carriage on a somewhat reduced scale relative to Fig. 11.

At this time the wheels 4 and 5 ride on the inner track unit, and the skip is then held against possible longitudinal or lateral tilting relative to the rails by means of lugs 73 rigid with the carriage 3 laterally inward of and adjacent the wheels engaging under the heads of the rails 8, as shown in Fig. 14.

Since the bucket swings on the spindle 15, swinging movements thereof may be controlled by suitable manipulation so as to cause the digging teeth 43 to dig in any position along the face of the muck within the limits of the digging radius. The level of the digging may be varied by tilting the platform 12—and the bucket thereon as well—by means of the air cylinders 24. In this connection it will be noted that the bucket projects well ahead of the carriage 3, as shown in Fig. 3, so that the muck may be engaged at a level below that of the carriage and rails upon suitable tilting of the bucket.

In order to prevent the skip from backing up and so as to provide extra digging ability in the event that the muck is of a tough and hard-to-dig nature, a crowd bar 74 is swivelly mounted at one end on the back of the carriage for ground engagement when necessary; said bar being normally held out of the way by a retaining clip 75.

The scoop having been filled by a pass of the digging teeth into and across the face of the muck, the digging and pull-back lines 17 and 18 are manipulated by the operator of the winch, while the hoist line 10 remains slack, so as to hold the skip clear of the muck while swinging the bucket toward a reversed position sufficient to cause the gate unit 44 to open, as previously explained. When this occurs, the scoop load drops into the bucket proper. The bucket may then be returned to the digging position; the gate unit 44 again closing, also as previously described, before the bucket reaches such position, so as to retain the muck in the bucket and prevent the same from returning to the scoop. The digging and scoop filling and discharging operations may then be repeated until the bucket is filled.

While these operations are being carried out, the platform 12 and bucket must remain tilted to allow the locking pin 33 to clear the deck 11 as the bucket swings from one position to the other.

After the bucket is fully loaded and has been swung to its reversed position, with the pin 33 in the opening 32, the platform 12 is lowered into the deck 11 by manipulation of the cylinders 24. This locks the pin 33 against movement out of said opening and prevents swinging of the bucket, as previously explained.

The weight of the skip is then held by the hoist line 10, while the digging and pull-back lines 17 and 18 are detached from the bucket and moved clear of the rails to one side of the same, as indicated in Fig. 4. The skip is then pulled up to the mouth of shaft 1 by the hoist line 10, as shown in Fig. 5. At this point, the rails 7 are bent to extend horizontally for a relatively short distance, as at 7a. Correspondingly short rails 76 project as straight extensions of rails 7, being secured to the outer sides of said rails adjacent and ahead of the bend thereof. In order to engage the rails 76, each carriage wheel 4 is provided with an auxiliary tread portion 77 (see particularly Fig. 15), which projects outwardly from, and is of smaller diameter than, the tread portion of wheels 4.

With this rail and wheel arrangement, the wheels 5 continue along the rail extensions 7a as the skip is pulled out of the shaft. The auxiliary tread portions 77 of wheels 4, overhanging the extension rails 76, engage the same as the skip is thus pulled, and the wheels 4 do not engage and follow the portion 7a of the rails 7.

When said auxiliary tread portions 77 thus engage the extension rails 76, the adjacent side edges of the main tread portion of wheels 4 form the side rail engaging flanges of said auxiliary tread portions.

As a result of the specific rail and wheel arrangement, as above described, the skip is tilted downwardly toward its scoop end, and the gate unit 44 being open the bucket load discharges between the rails, as shown in Fig. 5.

When the load has been thus discharged, a slackening of the line 10 will cause the skip to return, by gravity, to a normal position on rails 7, ready to be lowered into the shaft 1 for another digging and loading operation.

While this skip has been particularly shown as being used in an included shaft, its used is not limited to such a shaft, as it will also operate in a vertical shaft.

From the foregoing description it will be readily seen that there has been produced such a device as will substantially fulfill the objects of the invention, as defined by the appended claims.

While this specification sets forth in detail the present and preferred construction of the device, still in practice such deviations from such detail may be resorted to as do not form a departure from the spirit of the invention as defined by the appended claims.

Having thus described the invention, the following is claimed as new and useful, and upon which Letters Patent are desired:

1. A mucker skip to remove muck from the head of a shaft, said skip comprising a carriage arranged for movement along the shaft to the head end thereof, a bucket mounted on the carriage for swinging movement about an upstanding axis, said bucket being open at one end and closed at the other end, a digging lip projecting laterally at a forward angle from one side of the bucket at the open end and toward the other side thereof for engagement with the muck, and means connected to the bucket to swing the same back and forth about said upstanding axis; said means comprising a winch mounted in the shaft a predetermined distance back from the head thereof and laterally out from said other side of the bucket, a pull-back line leading from the winch to a connection with the bucket on said one side and below the top thereof, a direction-changing pulley mounted in the shaft laterally out from said one side of the bucket and about which said pull-back line passes, a digging line leading from the winch toward the other side of bucket, a rigid bail-bar extending across the bucket adjacent the top thereof, the digging line being connected to the end of the bar at said other side of the bucket, a pivot connection between the bar and bucket at said one side thereof, and means on the bucket engaging the bar to prevent swinging movement of the latter over the bucket.

2. A mucker skip to remove muck from the head of a shaft, said skip comprising a carriage arranged for movement along the shaft to the head end thereof, a bucket open at one end and closed at the other end, a digging lip projecting laterally at a forward angle from one side of the bucket at the open end and toward the other side thereof for engagement with the muck, means mounting the bucket on the carriage for swinging movement about an upstanding axis and independent tilting movement relative to the carriage, means to control the swinging of the bucket, and separate means to control the tilt of the bucket; the bucket mounting means comprising a platform, a spindle mounted in a fixed upstanding position and on which the bucket is turnably mounted, and means pivoting the platform at its forward end on the forward end of the carriage in a plane transversely of the spindle and of the carriage.

3. A skip, as in claim 2, said tilt control means comprising a power cylinder mounted on and under the carriage lengthwise thereof and a connection between the platform and cylinder to raise and lower the platform about the transverse pivot upon actuation of the cylinder.

4. A mucker skip to remove muck from the head of a shaft, said skip comprising a carriage arranged for movement along the shaft to the head end thereof, a bucket open at one end and closed at the other end, said bucket having opposed upstanding sidewalls, a digging lip projecting laterally at a forward angle from one of said sidewalls of the bucket at the open end and toward the other sidewall thereof for engagement with the muck, means mounting the bucket on the carriage for swinging movement about an upstanding axis from an operative position wherein the digging lip faces the head of the shaft and a fully reversed position wherein the bucket is substantially parallel to the shaft, means to thus swing the bucket, and cooperating elements on the bucket, the mounting means and the carriage separate from the bucket swinging means to prevent the swinging of the bucket when in the reversed position.

5. A skip, as in claim 2, with a pin depending from the bucket and disposed between one end of the bucket and the spindle, the platform having an opening on one side in position to receive the pin when the bucket is swung to a position wherein the open end of the bucket faces away from the head of the shaft, and a stop-forming surface on the carriage positioned to substantially engage the side of the pin opposite the platform opening when said platform is disposed in a non-tilted position relative to the carriage.

6. A mucker skip to remove muck from the head of a shaft, said skip comprising a carriage arranged for movement along the shaft to the head end thereof, a bucket mounted on the carriage for swinging movement about an upstanding axis, said bucket being open at one end and closed at the other end, a digging lip at said open end of the bucket for muck engagement, means to swing the bucket about said axis from a digging position to a reversed position on the carriage, a gate unit in the bucket spaced from but relatively close to its open end and closed when the bucket is in a digging position, and means connected to the gate unit and functioning upon swinging movement of the bucket a predetermined arcuate distance toward a reversed position to pull open the gate unit.

7. A mucker skip to remove muck from the head of a shaft, said skip comprising a carriage arranged for movement along the shaft to the head end thereof, a bucket mounted on the carriage for swinging movement about an upstanding axis, said bucket being open at one end and closed at the other end, a digging lip at said open end of the bucket for muck engagement, means to swing the bucket about said axis from a digging position to a reversed position on the carriage, a gate unit in the bucket spaced from but relatively close to its open end and closed when the bucket is in a digging position, and means connected to the gate unit and functioning upon swinging movement of the bucket a predetermined arcuate distance toward a reversed position to open the gate unit, and means included with the last named means to adjust the extent of arcuate movement of the bucket required to open the gate unit.

8. A mucker skip to remove muck from the head of a shaft, said skip comprising a carriage arranged for movement along the shaft to the head end thereof, a bucket mounted on the carriage for swinging movement about an upstanding axis, said bucket being open at one end and closed at the other end, a digging lip at said open end of the bucket for muck engagement, means to swing the bucket about said axis from a digging position to a reversed position on the carriage, a gate unit in the bucket spaced from but relatively close to its open end and closed when the bucket is in a digging position, said gate unit comprising an upper transverse gate member and a lower transverse gate member overlapping the upper member when the gate unit is closed, means pivoting the upper member at its upper end in the bucket, a trolley guidably mounted on the top of the bucket for movement lengthwise thereof and projecting into the bucket through a longitudinal slot therein, connecting means between the trolley and gate unit to cause the gate members to fold in an upward direction and away from the open end of the bucket upon movement of the trolley in a corresponding direction, and means functioning upon swinging of the bucket a predetermined arcuate distance from a digging position toward said reversed position to pull the trolley along the bucket so as to open the gate unit.

9. A mucker skip, as in claim 8, in which said connecting means comprises a plate pivoted at its upper end on and depending from the trolley and pivoted at its lower end on the back of the lower gate member intermediate its ends, a pivot connection between the plate intermediate its ends and the upper gate member at the lower end thereof, and a tension spring unit connected to the trolley and to the lower gate member adjacent and in front of the plate.

10. A mucker skip, as in claim 8, with an upstanding spindle fixed on the carriage and about which the bucket swings, the spindle projecting upwardly through the top of the bucket; said last named means comprising a disc fixed on the projecting portion of the spindle, an arm turnable coaxially of the spindle initial projecting toward the trolley, another arm turnably mounted on the trolley and extending thence to a pivotal connection with the first named arm, spring means between one of the arms and the bucket tending to maintain the arms in substantial alinement and the gate unit closed, a stop bar mounted in and projecting from the periphery of the disc, and a stop pin on the first named arm depending therefrom in position to engage the stop bar upon swinging of the bucket about the spindle as an axis a predetermined arcuate amount from a digging position toward a reversed position.

11. A structure, as in claim 10, with means mounting the disc on the spindle for adjustment of the disc circumferentially on the spindle.

12. A structure, as in claim 10, in which the stop bar is retractibly mounted in the disc, with means on the bucket functioning to retract the bar, to allow the stop pin to pass by the same, upon swinging movement of the bucket a predetermined distance from a reversed toward a digging position.

13. A mucker skip to dig and remove muck from the head of a shaft, said skip comprising a carriage arranged for movement along the shaft from its outer end to the head end thereof, a bucket at one end and closed at the other end, said bucket having a lateral wall, a digging lip on said wall at the open end of the bucket for engagement with the muck, means mounting the bucket on the carriage for swinging movement about an upstanding axis from an operative position wherein the digging lip faces the head of the shaft, and a reversed position; means to manipulate the bucket and swing the same about said axis while in an operative position to cause the bucket to load the muck therein, and to then swing the bucket to a reversed position on the carriage when said bucket is loaded, and instrumentalities separate from the bucket swinging means to hold the bucket from swinging when in a reversed position.

References Cited in the file of this patent
UNITED STATES PATENTS

| | | |
|---|---|---|
| 764,201 | Newman | July 5, 1904 |
| 1,389,021 | Vest | Aug. 30, 1921 |
| 2,091,519 | Noyer | Aug. 31, 1937 |
| 2,426,591 | Boskovich | Sept. 2, 1947 |
| 2,530,714 | McDougall | Nov. 21, 1950 |
| 2,538,771 | Tapper | Jan. 16, 1951 |
| 2,659,502 | Erickson | Nov. 17, 1953 |
| 2,743,830 | Bares | May 1, 1956 |